United States Patent [19]
Li et al.

[11] Patent Number: 5,515,492
[45] Date of Patent: May 7, 1996

[54] USER INTERFACE BETWEEN A SERVER AND WORKSTATIONS OF A TRANSACTIONAL PROCESSING SYSTEM

[75] Inventors: Jianzhong Li, Chatenay Malabry; Jérôme Boudier, Paris; Isabelle Vilm, Nogent Sur Marne, all of France

[73] Assignee: Bull, S.A., Paris, France

[21] Appl. No.: 74,126

[22] Filed: Jun. 8, 1993

[30] Foreign Application Priority Data

Jun. 9, 1992 [FR] France .................. 92 06931

[51] Int. Cl.$^6$ .................................................. G06F 3/14
[52] U.S. Cl. ............................................ 395/155; 395/161
[58] Field of Search ................................. 395/155, 156, 395/157, 158, 159, 160, 161, 200, 275, 425, 600, 650, 775; 364/130, 419.07, 419.08, 221, 229, 230, 242.94

[56] References Cited

U.S. PATENT DOCUMENTS

| | | | |
|---|---|---|---|
| 4,878,175 | 8/1989 | Norden-Paul et al. | 364/413.01 |
| 5,077,666 | 12/1991 | Brimm et al. | 364/413.02 |
| 5,095,421 | 3/1992 | Freund | 395/650 |
| 5,335,346 | 8/1994 | Fabbio | 395/600 |
| 5,371,848 | 12/1994 | Casey et al. | 395/161 |

OTHER PUBLICATIONS

Udell, John, "Actor sets a New Stage for OOP", *Byte*, Jul. 1, 1990, V15A7, pp. 122–124.

*Primary Examiner*—Raymond J. Bayerl
*Assistant Examiner*—U. Chauhan
*Attorney, Agent, or Firm*—Kerkam, Stowell, Kondracki & Clarke; Edward J. Kondracki

[57] ABSTRACT

A system of transactional processing between an information processing server and a plurality of workstations, constituted on the one hand by three files that reflect the states of progress of tasks assigned to the actor using this interface, that is, the "new" file (40), the "ongoing" file (50), and the "executed" file (60) that are stored in memory, the first containing the tasks newly assigned to the actor, the second containing the tasks accepted, that are in the course of being executed or have temporarily been suspended, and the third containing the tasks accomplished, sent to others or abandoned, and on the other hand, means with which the files can be opened, means for describing the files, and means for representing the notes received.

16 Claims, 11 Drawing Sheets

USER INTERFACE BETWEEN A SERVER AND WORKSTATIONS OF A TRANSACTIONAL PROCESSING SYSTEM

CROSS-REFERENCE TO RELATED APPLICATIONS

The invention disclosed and claimed herein is related to the subject matter of the following commonly-assigned patent application, the entire disclosure of which is hereby incorporated herein by reference:

Ser. No. 08/071,766, filed concurrently herewith, by LI et al., entitled "System for Transactional Processing Between An Information Processing Server and a Plurality of Workstations".

FIELD OF THE INVENTION

The present invention relates to a user interface for a transactional processing system (cooperative application program).

SUMMARY OF THE INVENTION

One of the objects of the invention is to provide a user interface that enables easy access by the user to transactional processing system, by way of a user-friendly interface.

This object is attained in that the user interface, for a system of transactional processing between an information processing server and a plurality of workstations, is constituted on the one hand by three files that reflect the states of progress of tasks assigned to the actor using this interface, that is, the "new" file, the "ongoing" file, and the "executed" file that are stored in memory, the first containing the tasks newly assigned to the actor, the second containing the tasks accepted, that are in the course of being executed or have temporarily been suspended, and the third containing the tasks accomplished, sent to others or abandoned, and on the other hand, means with which the files can be opened, means for describing the files, and means for representing the notes received.

In another particular feature, the means are each constituted by a window including at least one bar making it possible to select at least one of the following functions, "send job", "create job", "send notes", "lists of notes sent", "list of receivers", and at least one text box.

In another feature, the means for opening the "new" files are constituted by a window that via a menu bar makes it possible to select one of the presentations, "new file", "ongoing file", "executed file" in order to cause a text box to appear that includes a job designation column, an activity designation column, a date of completion designation column, and a comments column, as well as a column indicating the notation "urgent" or "not urgent".

In another feature, characterized in that the "new file" window includes a command button bar making it possible to start the following functions: "accept", "process", "property form", "comments".

In another feature, the "ongoing file" includes a bar of command buttons making it possible to start the following functions: "direct to the next", "process", "property form", "comments".

In another feature, the "executed file" includes a bar of command buttons making it possible to start the "property form", "comments", "delete" functions.

In another feature, the "ownership" sheet function makes it possible to cause the display of a window including a field indicating the job name, a field indicating the date by which the job must be finished, a field indicating the procedure to which the job pertains, a field indicating the actor responsible, a text box causing the current activity to which the job pertains to appear, and including fields indicating the activity name, its status, the responsible person or entity, and the date of completion, and a command button bar making it possible to start the functions "accept", "process", "comments", "close" and "help".

In another feature, the "comments" function causes the appearance of a window that includes a menu bar enabling the selection of an editing or a printing menu, and a text box making it possible in a first field to display the job name, and on the one hand in a first text box to display the previous comments, and on the other hand in a second text box to display the new comments, each of the text boxes being provided with a vertical scrolling bar, the window being provided with a validation command button.

In another feature, the "send job" function causes the appearance of a window that includes a field making it possible to indicate the job name, a text box with three columns making it possible to designate the receivers of the jobs, with the possibility of designating the role in a first column, the name in a second column, and the activity in a third column, a second text box making it possible to include new comments, a command button requesting the return of the job to the sender, a command button making it possible to delay the sending of the job until a given date, and a button for validating the sending, cancelling the sending, and help.

In another feature, the text box makes it possible, with a "next" command button, to select the next receiver, with a "cancel" command button to cancel one of the receivers, and with the "insert" command button to insert a new receiver into the list.

In another feature, the button for controlling validation of sending causes a dialog box to appear, making it possible to select a sequential distribution or simultaneous distribution.

In another feature, the "create job" function causes a window to appear that makes it possible to write the job name in a first field, the reference of the procedure and a text in a second field, the person or entity responsible for the job in a third field, the date of the job in a fourth field, and the list of existing documents in a fifth field, and by command buttons to validate the creation of the job, to cancel the creation of the job, or to request help.

In another feature, the selection of the "send notes" or "list of notes sent" functions causes a window to appear that includes a text box and a command button bar. This command button bar makes it possible to select the following functions: "receivers", making it possible to display the list of receivers, "cancel" making cancelation possible, "close" enabling closure, and "help" making help possible.

In another feature, the selection of the "list of notes sent" function makes it possible to display a text box with four columns, making it possible to indicate the sending date in a first column, the subject in a second column, the receivers in a third column, and the choice between sequential or simultaneous sending in a fourth column, and the command button bar additionally includes a button for controlling the reading function.

In another feature, selecting the "send notes" function causes the appearance of a window that includes a text box with horizontal and vertical scrolling bars, command buttons in the bar, a "previous" arrow and a "next" arrow enabling the selection of the previous note or the next note and in the window, buttons for selection between sequential sending and simultaneous sending, and fields for designating the subject, the send date, and the receivers.

In another feature, the selection of the "display the list of receivers" function causes the appearance of a window that includes a field indicating the send date and a text box with three columns, the first of which designates the role, the second the name, and the third the activity, and a button for controlling the closure of the window.

DETAILED DESCRIPTION

Figure 1:
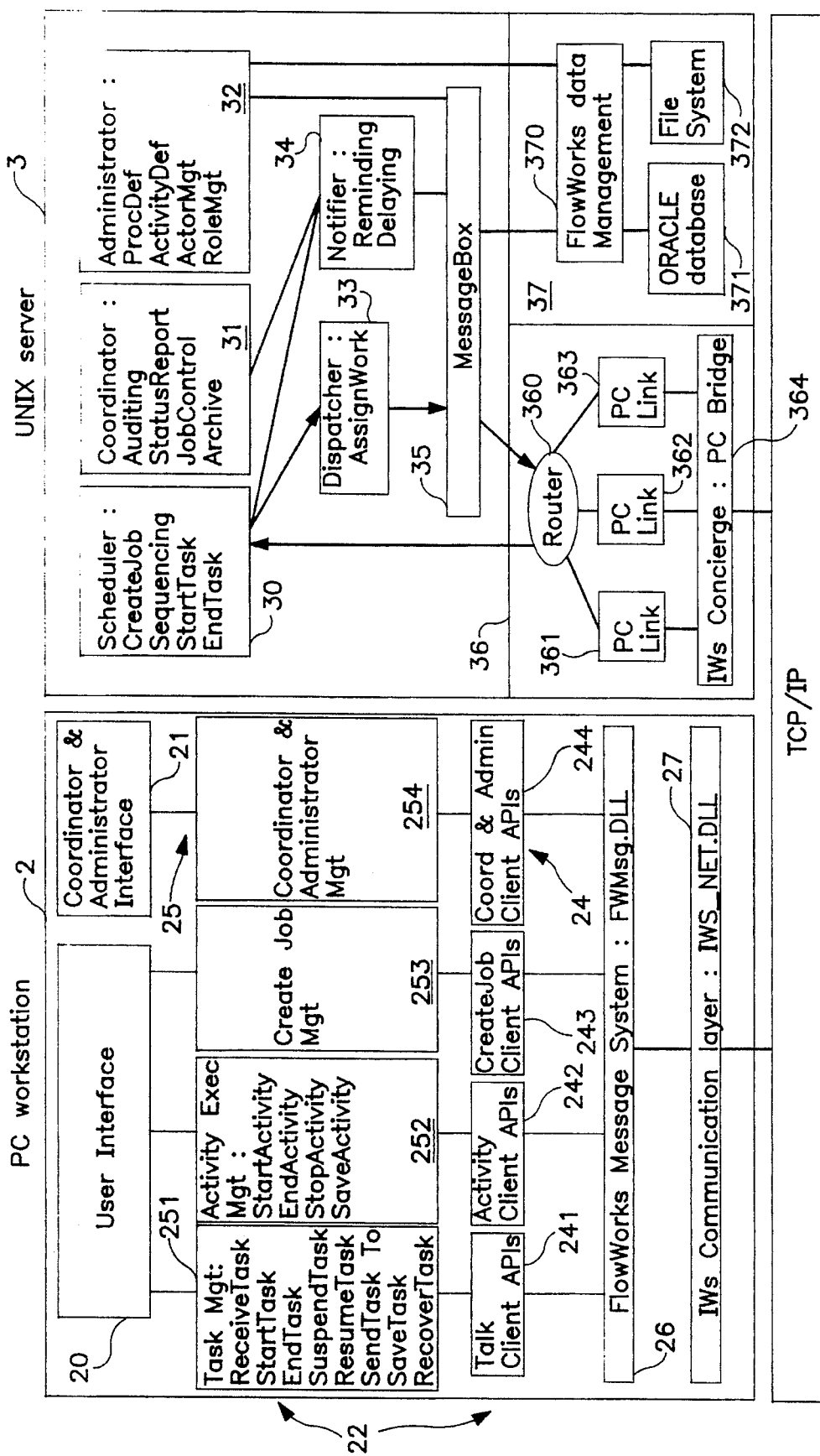
FIG. 1 schematically shows a transactional processing system according to the invention.

FIG. 1 shows a system for transactional processing between an information processing server (3) using processing data stored in a relational data base of an information processing server (3), for example of the UNIX type, and communicating with workstations (1), for example of the PC type, on which the work of an application that unfolds in the contact of activities is executed by the user of the workstation.

Figure 7:
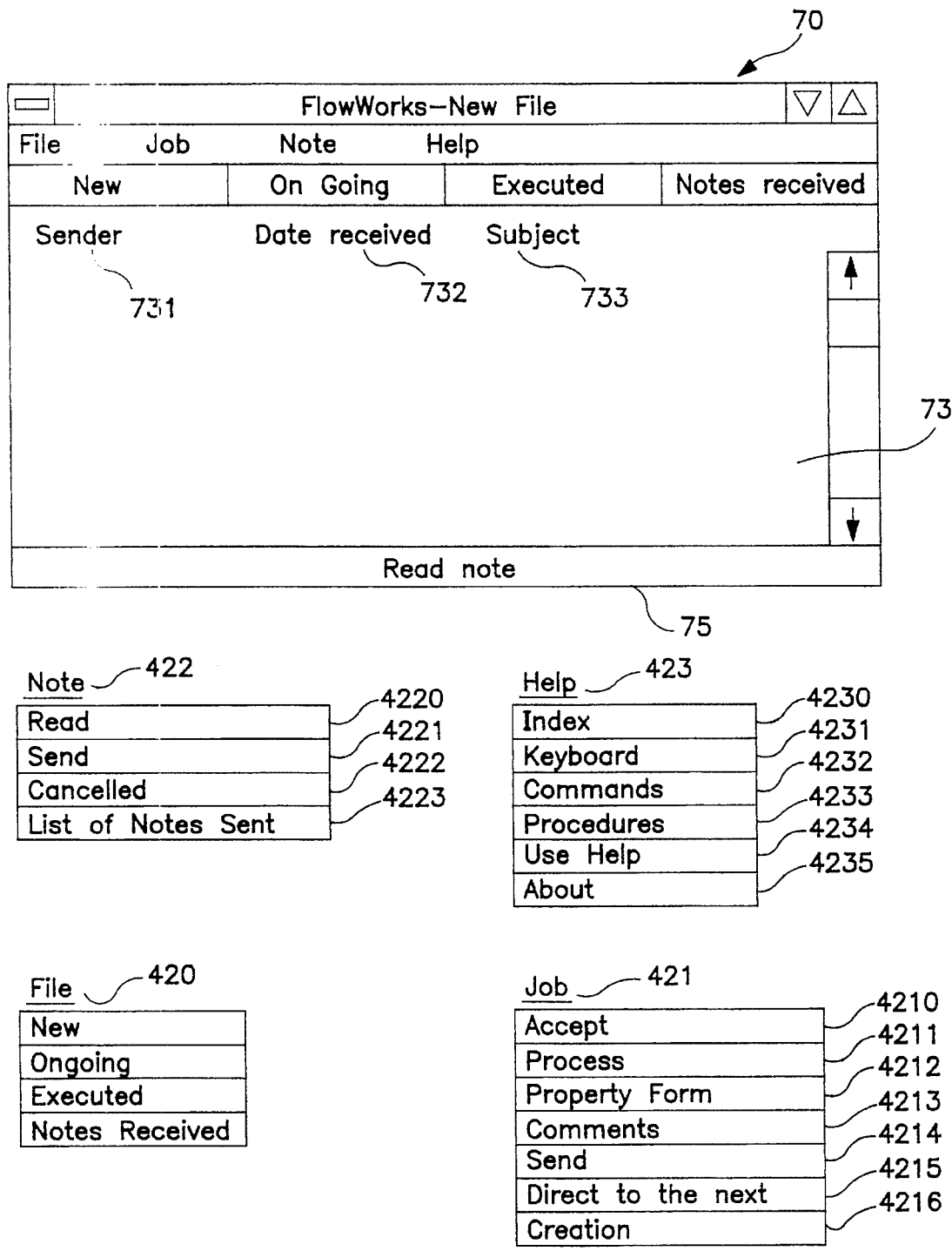

The server (3) of FIG. 7 includes a set of modules (30–37) which initializes and coordinates the activities. The term activity is understood to mean the body of a work step, or a procedure, that is, a basic work unit, which must be a sequential set of primitive actions executed by a single actor.

The activities may function by one of the following three modes: automatic, manual, and mixed.

The body of an activity constitutes the execution portion of an activity. This body includes a list of actions to be executed at the workstation. The order of these activities is not fixed and depends on the interruption by the actor executing them. An activity body includes an identifier and a list of actions (Ai). The pair [ProcedureId, ActivityId] in Appendix 1 uniquely identifies an activity body linked with the activity (ActivityId) that belongs to the procedure whose identity is (ProcedureId). An action N can be activated by the user on the corresponding form on the screen of the workstation (1). This action can be divided into two parts: a first part Ai, which is a command (PreScript) to be executed when the user wishes to select an action N (for example, initialization), and a second part Zi, which is the command (PostScript) to be executed when the user wishes to validate the action selected.

The actions of an activity are numbered from 0 to N. Action A0 is a particular in which the command (PreScript) for selection is automatically executed and validated prior to any other action.

A prefix PR of the activity calls up a form that furnishes the presentation and interaction phase for the activity on the screen of the station.

The structure of the data of the activity is furnished by a file whose name is preceded by the prefix ADV. The syntax of an action is constituted by a "action type" field (ActionType), a "action name" field (ActionName) and several arguments, which are job data vector (JDV) fields, represented by Ji, and activity data vector (ADV) fields, represented by Ai, and these fields are stored in the vectors (ADV, JDV) of the memory (370) of the server (3). The actions may be of the following types: executable, DLL function, DDE exchanges. The transactional processing system, aids in defining, executing, coordinating and controlling the flow of work between the organizations or work groups, being based on a description of the Office Tasks, which can be described as recurrent structured tasks called procedures, whose basic work elements are called activities and which must be executed by various individuals, called actors, in a certain sequence.

An actor consists of a unique identification of the actor (usrid) furnished by the system, an actor name (name), a first name of the actor (firstName), a unique session opening word (loginName), a password (password), and a tag (alias).

A procedure is a predefined set of work steps in accordance with a partial sequencing of these steps. One work step is formed of a header (identification, precedence, etc.) and a body (activity) which constitutes the actual work to be done. Various steps in a procedure may be done by different persons or different groups of persons. In certain cases, several steps of a procedure may be done at the same time or in any arbitrary order. In general a procedure is a partially ordered set of steps; that is, one in which not all the steps need necessarily be executed sequentially, and loops are authorized, or a set that is entirely ordered. The procedures conventionally have attributes, such as the name and the person responsible associated with the procedure.

A script is a specification of a procedure, an activity, or an automatic portion of a manual activity.

A job is the control location for a particular execution of a procedure. In certain contexts, the job is called a transaction. The jobs have parameters, such as state, initiator, and archive.

A role consists of the designation of an actor or a group of actors that act as a base for access commands and execution commands. This actor is not necessarily a single person, and an actor may play several roles of an actor in an organization. An actor is a person, program or entity that can perform the roles to be played and can be responsible for these roles or be associated to certain extent with the activities and procedure. The attributes or access possibilities may be associated with the actors and with the roles.

A role is defined by the following: a single word (rid) identifying the role, the name of the role (name), and the description of the role. The role of the actor including the following: the identification of the actor (usrid) and the identification of the role (rid).

Other parameters or attributes and structures may be associated in order to create an organizational model intended to improve the work flow.

The architecture, at the level of the software for transactional processing of the work flow constituting the system, can be broken down into a certain number of modules (30–37, FIG. 1). The modules become active when a job and/or an activity is begun or completed. A scheduler module (30) is activated by a message of activity completion, an activity exception, or the creation of a job.

In all cases, the job is started by any arbitrary process, which sends a message of the create job type to the scheduler module (30) of the server (3). The parameters of this message include the priority of the job, the expiration time, the name of the procedure, and the initialization parameters.

The scheduler (30), through the faculty of job creation, creates the job, assigns it a unique number, defines the status information for this job, and performs various initializations.

The work of finalizing is also done by the scheduler (30), through the facility of job completion when all the activities for a job have been done. The scheduler verifies all the predecessors of all the possible successors of a completed activity.

If the completed activity was a decision activity, then the scheduler examines the variable resulting from this activity. If one or more successors are validated, a message is sent to a dispatcher module (33), with which the scheduler carries on a dialog. The scheduler consists of a program loop represented in Appendix 2, consisting of reading the messages received and processing the message.

Calling up the function "WFsvSchedCreateJob" starts the verification of whether the publication status of the procedure is valid, and if so, creates a new job for the procedure identified by its procedure identifier (Pid) with a predetermined priority.

Calling up the function "WFsvSchedStartTask" starts reading of the procedure definition table with initialization of a task, and on the other hand, calling up the function "WFsvSchedEndTask" starts the completion of the task with loading of the vector JDV into the server (3).

The scheduler module then carries on a dialog with a dispatcher module (33) and a signaler (notify) module (34). The scheduler marks the new tasks that have been created with the status "todispatch" and notifies the dispatcher of this by placing a message in a message box (35).

The dispatcher module has three main functions:

a) Assigning to a user the tasks that have been created by the scheduler.

b) Assigning to another user a task that has just been rejected.

c) Effecting the distribution and circulation of an activity among the users.

The dispatcher module (33) is the first module, which leads and is led by the actor and the role entities. In its third function, for a given activity, the dispatcher (33) establishes a match between a role and one or more actors. If one or more actors must be selected as a receiver, then the dispatcher applies the basic distribution algorithms, effecting a linear distribution; that is, the dispatcher arranges the possible receivers (actors) in random order and proceeds linearly through this list. It delivers the first job to the first actor, the second job to the second actor, and so forth until the list is exhausted. This is then repeated continually, in such a way that all the actors receive approximately the same number of jobs.

In the first function, when a first task is assigned, the status of the task in the sched-job table is indicated as "OFFERED", and a message is sent to the user intended to perform the job.

In its second function, when a user rejects a task that he cannot execute, the status of the task is changed to "rejected" in the sched-job table, and the dispatcher receives a message. The dispatcher then memorizes the fact that the task has been rejected, and by whom, in the archives and in the verification history (auditing), and proceeds as if the task originated from the scheduler.

The application programming interfaces corresponding to these three functions are indicated in Appendix 3.

The signaler module 34 preserves a trail of timed events and signals the correct recipients at the proper moment.

Two timing utilities are also provided in the signaler module, that is, the capability of recall and the capability of delaying: the first, for instance to impose a limit stop for the execution of a specific activity and to send a message warning when the stop time has expired, while the second makes it possible to delay the sending of a message for a certain period of time, for instance in order to ask an actor to do a certain job after a certain delay.

The signaler (34) also receives information from the coordinator (31), which takes notice of what happens within the work flow management system. The coordinator furnishes the facilities of internal management monitoring, in order to preserve a trail of significant events and to store the log files freed up, the ways of interrogating the system about the various statuses (Who does what? What is the degree of progress of a specific job? How many jobs are ongoing? Average time to execute a job, average time to execute a task, history of the jobs, current status of a job, information obtained by a predetermined job, files for executing a given activity in the course of a given procedure, conflicts in a given job, etc.), the possibility of affecting the progress of the jobs (suspension, resumption, cancellation, reassignment, etc.), and the means for saving a history by archiving.

The dispatcher (33) and the signaler (34) exchange signals with the message box (35), which serves to save all the asynchronous messages. These messages may be activities assigned to actors, warning messages being generated in the signaler 34, messages between actors, and so forth.

The message box is constituted essentially in a relational data base, such as the BULL base called ORACLE. The server of the message box is a particular server which manages and memorizes the asynchronous messages.

When a client request is asynchronous, the result is memorized as a message in the message box, through the message box server. The only way to access the message box is through the message box (35) server. For example, when the dispatcher (33) assigns a task to an actor, a message is thus sent to this actor, informing him that a work subject has arrived. This is done by the message box server, which writes a message of the "offer-task" type in the message box.

The message box server is constituted principally by a program loop which is shown in Appendix 4.

The message box is principally constituted by two tables of data from a relational data base (31), such as "ORACLE" for example. The first is called MSG-BOX-DESC, which contains the description of messages, such as a unique identifier, the type, and so forth. The second table is called MSG-BOX-BROADCAST, which is used to memorize the addresses of the messages and other information such as the statuses of messages. It is important to note that a message may be addressed to a plurality of addressees, and consequently the second table MSG-BOX-BROADCAST must contain the list of addressees, while the description of the message is written only a single time in the table MSG-BOX-DESC.

Finally, a message may have one of the three following statuses:

TO-READ: which signifies that the message is available;

READ: which signifies that the message has been read;

TO-DELETE: which signifies that the message has been deleted.

Finally, this message box (35) also receives signals from the administrator (32). This module is used in a deferred mode to model, create, test and match the various entities of the basic system, the procedures, activities, roles and actors.

This step may involve analysis of organizational structures, information flows, and office procedures. The "form" and "security structure" activities must be created.

The procedural scenarios are written, for example, by using the formalities of software for creating an ICN (information control net), which is described in another patent application that has been filed. The bodies of activities are written by using a notation founded on a visual base. The activity bodies are one of the vehicles of data exchange among the activities of the relational transaction manager and the various external servers.

The system also includes a data management module (370), which stores the relational tables in the data base such as oracle in order to represent the definitions, relations, and attributes of all the procedures, activities, jobs, roles and actors.

These tables comprise dynamic tables, marked with an asterisk and static tables.

The dynamic tables are constituted by the following data bases: SCHED-JOBS, SCHED-STATEP shown in Appendix 8, SCHED-STATUSP shown in Appendix 8, SCHED-TASKP, JDV-JDV and ADV-ADV shown in Appendix 5. These tables have their rows inserted and updated during the execution phase of the scheduler. Normally, there is one set of dynamic tables for each procedure executed in the system.

A table set contains all the execution data for all the jobs of one procedure.

The static tables are constituted by the following data bases: ORGA-ACTOR, ORGA-ROLES, ORGA-R-OFF-ACT, SCHED-PROCEDURES, SCHED-ACTIVITIES, SCHED-PRECEDENCES shown in Appendix 8, JDV-PDDEF (procedure data definition) shown in Appendix 6, EDA-ORA (external data accessor to ORACLE) shown in Appendix 7. These status tables contain the information on the procedures executed.

The scheduler accesses these tables only in the reading mode and relies on this information, which it memorizes for the execution.

All the dynamic tables include a column indicating the procedure identifier Pid, to which the data contained in the tables are assigned. A job name column Jid is added to the table SCHED-JOBS, and it will be filled optionally by the user upon initialization of a job.

The information concerning the data used to assign and dispatch the tasks and roles to the user includes a RoleId column in the SCHED-TASKP table, which will be filled at the moment of creation of the task by the scheduler, based on the information found in the SCHED-ACTIVITIES table.

Finally, a distribution table and a circulation table shown in Appendixes 4 and 8 make it possible for the dispatcher to have the elements for assigning the activities to the various user stations.

With the distribution table and the information control net, it is possible to describe the circulation of information in an office. The distribution describes the circulation of an activity among the various members of the organization.

The distribution table, as shown in Appendix 4, includes a distribution identifier Did, a procedure identifier (Pid), an activity identifier (Aid), the role information (RoleId), the user identification information (Userid), information indicating that the user identifier is at the top of the circulation list (First), and a new user information (Next Userid).

The circulation table is constituted as shown in Appendix 4 for the information Did, Pid, JobId, Aid for the activity identifier, RoleId, Userid, First, Next Userid.

Figure 2:
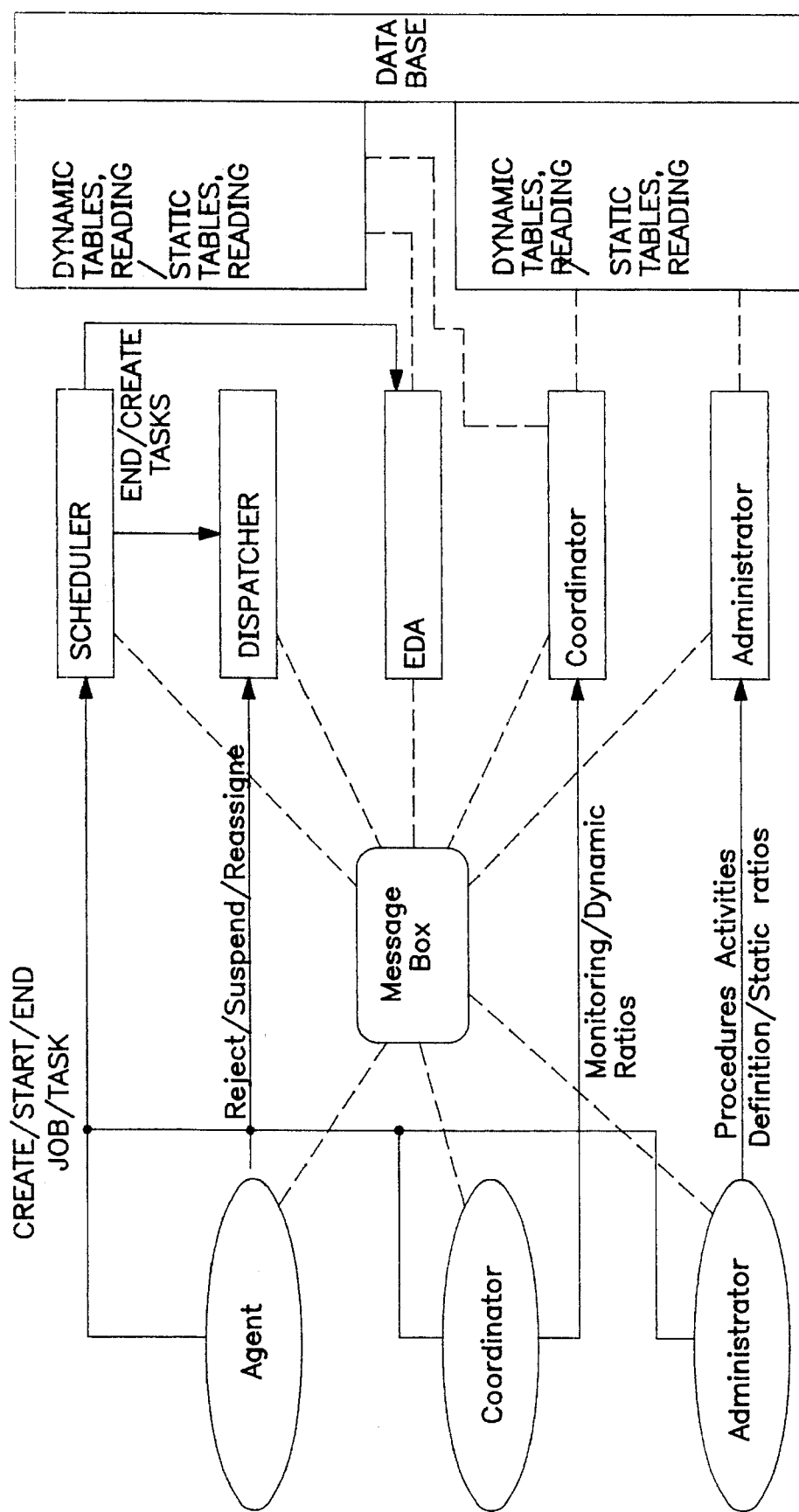
FIG. 2 schematically shows the exchanges among the various modules of the transactional processing system.
Figure 3:
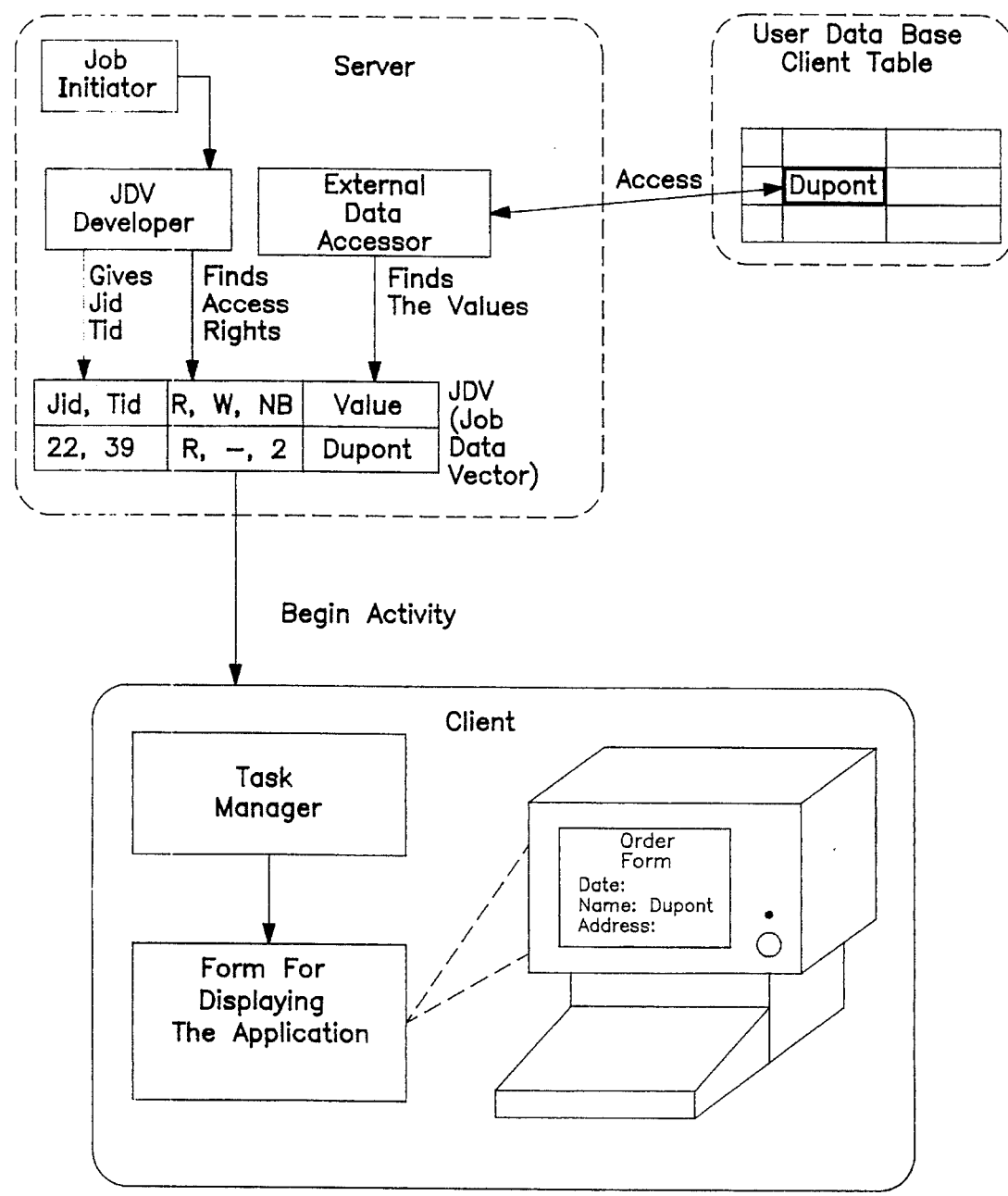
FIG. 3 shows the information that travels among the various elements of the transactional system when a job is created.

FIG. 2 shows the logical organization of the services rendered by one or more modules, and their interactions with the user agent of the transactional system, which is the administrator, the coordinator, and the agent.

The table JDV-JDV is constituted as shown in Appendix 5 by a job identifier (Jid), an activity identifier (Aid), a task identifier (Tid), a field identifier in the JDV vector, a state (STATUS), which may be one of the values TO-ACCESS, READFWK, READEXTERN, ARCHIVED, a field identifier FLD-NAME, a field pass mode PASSMODE, which may have the values VALUE or REF to indicate that the field is transmitted by a value or by its reference, a field type (FLD TYPE), which may be a date, character or an integer, a byte length of the value transmitted contained in LENGTH, the value of the field if the field type is a date contained in FLD-DATE, the field value if the field type is a character or if the pass mode is REF contained in FLD-KCHAR, the value field if the pass mode is INT contained in FLD-INT, and the current value of the field designated in JDV-PDDEF as a dependence field in ACCESS-KEY.

In addition, the relational data base safeguards several types of data necessary for executing the activities, such as the specific procedural information, specific jobs contained in the job data vector (JDV), and the specific activity information contained in the task data vectors (TDV). These vector data elements are data values or pointers pointing toward the information stored in external information directories. Each of the components in the vector is assigned a value type and an initial value. The initial value is null and is specified by the initialization event or is loaded by the job creation module at the start of the job. When an activity is started, a copy of the job data vector is made available to the client through the network server, where the copy of the JDV vector is loaded to the workstation. Certain elements of the vector are read, and certain ones are written by the activity when it is run.

Once the activity is completed, the vector is selectively copied or unloaded to the server (3). Similarly, the activity data vectors store the values and references for the specific activity data. Its format is identical to the format of the JDV vector.

To accomplish these various actions, the system uses the data management module (37), whose function is as follows:
  to attach the appropriate data to the specific jobs by creating the JDV vector and by starting the filling of this vector with the specific data, in order to then transmit the vector to the workstation (2) when a user has need of it;
  to manage the integrity of the data and security by furnishing mechanisms for attaching the rights of access to the data and locking strategies to protect the data from competing accesses;
  to retrieve and access the data in the bases of the external user by calling on an EDA module for access to external data bases. The data necessary for accomplishing these functions are stored in the procedure data definition file PDDEF and in the EDA-ORA file, which are shown in Appendixes 6 and 7, respectively.

The modules (30–37) of the server (3) communicate through the communications system, which includes the elements (36, 2, 17, 16), which a client module consisting of a set of modules (10–15). These modules will be described hereinafter.

The server system (3) communicates through a net (1) and a net server (364) with a client system (2) including a communications interface (27) and a four-layer architecture, the first layer of which is the system of messages in the work flow (26), the second layer (24) is constituted by various interface sets of client application programs (241, 242, 243, 244), a third layer (25) for service management (251, 252, 253, 254), and a fourth layer (20, 21), which is the upper interface layer. The various modules of one layer have no interaction among one another.

The system of messages in the work flow (26) makes possible the exchange of information between the work flow of the client and the work flow of the server.

The information exchanged is transported by a specific structure called a "message". This layer performs the following functions: connection with the communications layer of the server (364), disconnection from the communications layer of the server, and sending and receiving messages.

The connection function makes it possible to establish a permanent link with the server (36). One workstation can handle a single connection. To do so, all the messages that are exchanged by the sending and receiving functions pass through this link.

A message is composed of an envelope portion and a data portion. The envelope portion contains the sender, the addressee, and the status information, while the data portion contains the contents of the message.

The system of messages (26) has no knowledge whatever of the subject of the contents of the message, nor of the envelope, and still less of the data. This module sends the envelope portion and the name of the file that contains the data portion through the link made with the server, while the file of the data portion is already in the shared file system (372), while is shared with all the workstations and the server.

The interfaces of client application programming all join together the interactions between the workstation and the server. These interfaces are classified in accordance with the following activities: administration, constituting an interface (254); coordination, constituting an interface (254); job creation, constituting an interface (253); activity execution, constituting another interface (252); and tasks, constituting a final interface (251).

All these programming interfaces are generated by an automatic code generator for a given description of the input files. This assures coherence among the client and server programming interfaces.

The administration programming interface layer (244) defines the data that are classified in accordance with the concepts and data defined for the transactional processing system. It makes it possible to define procedures, activities, actors and roles and to assign or unassign a role to an actor.

The coordination interfaces (244) make it possible to control the execution of a job and are constituted by the following elements: status of a job, progress of a job, history of a job, who does what, active job number, suspension of a job, resumption of a job, cancelling of a job.

The set of client interfaces (243) for creating a job is constituted by interfaces that participate in creating a new job in a predetermined procedure. The activity execution interface set is not defined.

The task interface set (241) gives an actor the facilities to execute the scheduled, dispatched tasks. These facilities are classified as follows: reading of an offered task, accepting of an offered task, searching for the corresponding job data vector in the server, completion of a task, and restoration of the re-updated job data vector to the server, redirection of a task to another actor or activity.

The service management layer joins together the modules (251–254) which manage the various services proposed to the actor. Each module furnishes a well-defined service set to the actor, processes and preserves the useful data locally, and calls the appropriate, respective client application programming interfaces (241–244) to furnish the desired service.

An administration and coordination management module (254) furnishes the actor with the services for defining the concepts and data in the work flow. This includes the links with the appropriate interfaces and the support of process definitions. Coordination management sends the server the requests for coordination coming from the corresponding user interface and processes the responses received.

The job creation management module (253) amounts to transmitting the job creations and the requests for job creation to the server and may be capable of furnishing a surrender of job creation while the actor prepares the initialization data corresponding to the data definition procedure PDDEF and starts the effective job creation in the server.

The activity execution management module (252) is dedicated to performing the execution of the body portion of the activity. This execution is requested by the task management module (251) through the user interface (20). Such an execution may be considered as a surrender of work during which the actor executes the corresponding actions.

Aside from these actions, which are part of the normal execution of an activity, the actor has the capability of suspending, cancelling or naturally terminating a work surrender.

To this end, the activity execution management module is provided with the following possibilities:

reading the activity description file;

reading and writing the job data used in the activity;

reading and writing the corresponding task data used in the activity and controlling the rights of access to the job data;

starting the appropriate presentation form for the activity and executing actions corresponding to the activity in a guided manner.

A task management module (151) is dedicated to managing the multitasking aspect of an actor, since the transactional processing system offers the actor the capability of processing multiple tasks at the same time. To that end, this module locally preserves a task memory and affords the capability of safeguarding and retrieval of this memory and deletion of tasks from this memory. This module includes an operation set for normal execution of the tasks, which are as follows:

receiving an offered task;

accepting an offered task;

searching for the corresponding data of the job vector in the server;

completion of a task;

restoration of the updated job vector to the server;

redirection of a task to a different actor or a different activity;

calling up the activity of execution of a corresponding task by the user interface;

processing and locally preserving data corresponding to the tasks, and their history.

Finally, a note management module, not shown, is also provided to furnish the actor with the capability of creating a note, attaching a note, reading and writing, receiving and sending a note, and local processing and maintenance of notes sent and received.

The upper layer is constituted by the interface layer, which includes a coordinator and administrator interface (21) and a user interface (20).

The administrator and coordinator interface (21) includes concept and data editors and job control. The user interface includes the software, the portions enabling the interactive use of the transactional use of the processing system, the activity execution guided by a form, and the automatic use of the transactional processing system. These interfaces are started either by the actor himself or by the management module 251.

The user interface enables the actor to participate in and contribute to office work. Through it, the actor is capable of accomplishing the tasks assigned to him, starting a new job, and exchanging messages with the other actors. The actor is identified by his name and his password in the connection process.

In the course of operation, the events of job creation cause the scheduler module to start a new job. Hence the scheduler can start a first activity. Next, an actor (a specific user) is assigned by the dispatcher to the first activity, and the job is sent to the workstation of the appropriate client. When the workstations has completed, the activity, the job is returned to the server, where the scheduler updates the status of the activity and finds a new activity. The scheduler calls the dispatcher to assign the actors as a function of the roles, and then the job information and requests for execution are sent to the appropriate client machine to execute the next activity.

All these statuses, activities, roles, actor uses, and assignments of information are recorded by the verification facility (auditing) of the coordinator module, once the assignments have been made. This cycle continues until the last activity has been completed, and at that moment the scheduler proceeds to complete the job.

The activity execution management module (252) monitors and supports the execution of activities by executing the program body corresponding to the activity requested. This body can access the external data and can have access to specific data for the job or specific data for activities. Since this activity is often interactive, the user interface module is called on by this body. The documents and forms are displayed and manipulated by the user as a portion of this activity.

Once the activity is completed, a message is sent to the software of the server indicating the new status. Since a client may work on more than one job simultaneously, the task manager module (251) preserves the statuses of the jobs and presents the various jobs and their statuses to the user. At each workstation, the appropriate information is accessible, and all the information is preserved when a user turns off his workstation. Multiple roles may be resident in a single client machine.

The interactions among the modules are facilitated by the communications subsystem (27, 1, 36), which authorizes the exchanges of messages among the modules of the system and among the users. This system supports both synchronous communications (an example being "fetchtask") and asynchronous communications (an example being "sendto"). The interactions of these communications are employed by the various layers of the communications protocol.

In a variant embodiment, the transactional processing system may be used with a user interface, such as that described hereinafter, which makes for great ease of use for the user.

This interface is based on documents, icons and forms, and is constituted in the form of three files that can be accessed and manipulated by the transactional processing system.

These are the following files: new tasks, ongoing tasks, and completed tasks. The tasks which are the work to be done may be conceptualized as "activity instances".

The elements in the "new tasks" file are jobs with a validated status, ready to be executed by this role. By opening the file, the user can request and initiate new tasks. This initiation action causes the status to change to the active mode, displaces the task icon to the "ongoing tasks" file, and opens the first form associated with the task on the user screen.

By opening the "ongoing tasks" file, the user can visually display the progress of the tasks. The status, priority and urgency of each task is also displayable. Numerous tasks may be activated with either none, one, or more than one of their task forms open simultaneously at the same station.

The "completed tasks" file is the means for the user to interrogate the system about the current status, past history, or performance faults of the jobs.

The "notes received" file contains the messages sent by the other users of the transactional processing system or by the modules of the system and that have been received. This enables informal, flexible communication among the users of the system.

In general, the task-specific information, tools and external accesses are represented as elements, icons and menus on the task form.

This interface (20) includes software for presentation and constitution of the files. This software is in relation with a connection of the terminal with a mouse, which makes it possible to cause external events. The mouse of the type with two buttons has been chosen, the left-hand button being assigned conventionally to selecting zones or graphical objects on the screen and for calling the editor, while the right-hand button is assigned to specific operations, such as the manipulation of certain menus. The external events originating in the mouse are processed by a preprogrammed mouse interface incorporated in the software and furthermore capable of recognizing when a button is pressed (down) or relaxed (up) or when the mouse is dragged, as well as logical events such as the entry of the mouse pointer into the window. In the screen, the position of the mouse pointer is marked by a small arrow pointing upward.

It is understood that without departing from the scope of the invention, the mouse could be replaced by any other pointing device, such as a light pen or a graphical table. Finally, as a supplement to the mouse interface, an interface is also provided for a programmed keyboard for as many character keys as there are control and pointer keys, so that in the editing mode it is possible to input the information corresponding to the various zones of the various windows.

Figure 4:
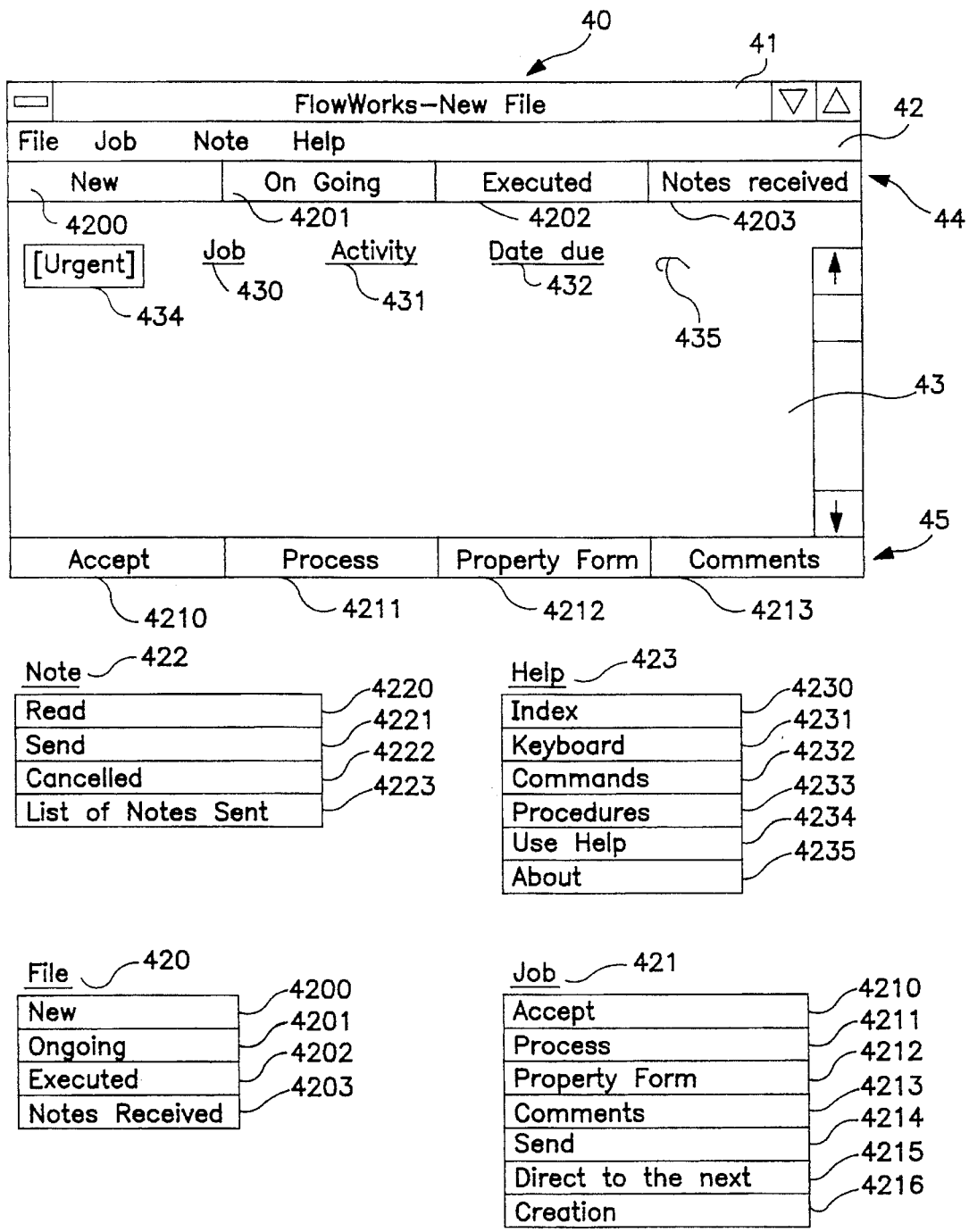
FIG. 4 shows the screen displayed by the terminal of the system upon routing thereof with the particular presentation interface.

The presentation software makes it possible to display the windows and execute the actions selected on the menu of the window following the tripping of an external event, an example being action on a mouse button. The first window displayed after the connection with the server is the window (40, FIG. 4).

This window (40, FIG. 4) includes a title bar (41), below which is a menu bar (42) enabling the selection of one of the objects found on the menu, specifically file (420), job (421), note (422), and help (423). Each of the objects selected causes the option of a choice of attribute to appear, for example for the file object (420), the choice is among the new attribute (4200), ongoing attribute (4201), completed attribute (4202), or note received attribute (4203).

This choice, when validated, makes it possible to change windows and to cause one of the other windows to appear, that is, "ongoing file" (50, FIG. 5), "executed file" (60, FIG. 6), or "note received" (70, FIG. 7).

For the job object (421), the choice is among the functions of "accept" (4210) to accept a task, an action which is implicit if the task has been started, "process" (4211) to start or continue the execution of a task, "property form" (4212) to see the file that shows more information on the subject of the task in the list, the "comment" function (4213) in order to see the comments concerning the current task, and the comments edited in the preceding step and optionally to edit new comments. The "send" function (4214) is used for sending all the activity data to an actor, a role or an activity. This function can also be used to reject a task. The "direct to the next" function (4215) is used to specify that the task has been completed and can be sent to the next step of the procedure. The "creation" function (4216) is used to create a new job.

In the "job" menu, it can be seen that the "direct to the next" function appears in thinner characters than the other functions, because this function cannot be selected when the "new file" window indicated by the title bar (41) is displayed.

The "note" menu (422) includes the "read" function (4220) in order to display a note received or sent. The "send" function (4221) is used to edit and send a note. The "cancel" function (4222) is used to delete a note received or sent from the list, and the "list of notes sent" function (4223) is provided in order to be capable of displaying the list of notes that have been sent.

The "help" menu (423) includes the following functions: "index", "keyboard", "commands", "procedures", "use help", "relating to . . . ", which are conventional functions and will not be described in detail here.

In the "note" menu (422), it can also be found that the "read" function (4220) and "cancel" function (4221) are not in heavy characters like the others (send, list of notes), which indicates that these functions (4220, 4221) cannot be selected when the "new file" window (40) is displayed. This "new file" window is supplemented by a frame (43), which includes a "job" column 430 enables indicating the job identifier, a "activity" column (431) allows indicating the activity name, a column (432) for indicating the date by which the activity must be completed, and a comment column in which a sign appears to indicate whether or not comments are attached to the job. Finally, a label (434) appears facing the job or activity created, to indicate whether or not it is urgent.

When one is in the window and in the "new file" menu, the button line (44) for selecting the attribute of the files causes the new selection button (4220) to appear with a different background from the "ongoing" (4201), "executed" (4202) or "notes received" (4203) selection buttons.

The window also includes command buttons (45) that enable directly starting the functions of "accept" (4210), "process" (4211), "comment" (4213), "property form" (4212) of the "job" menu (421).

The "ongoing file" window (FIG. 5) includes the same menus and the same elements, except for the command button bar (55), which causes the following functions to appear: "direct to the next", "process", "property form", and "comments". Also unlike the window of FIG. 4, this window does not enable the selection of the "accept" function (4210).

Figure 6:
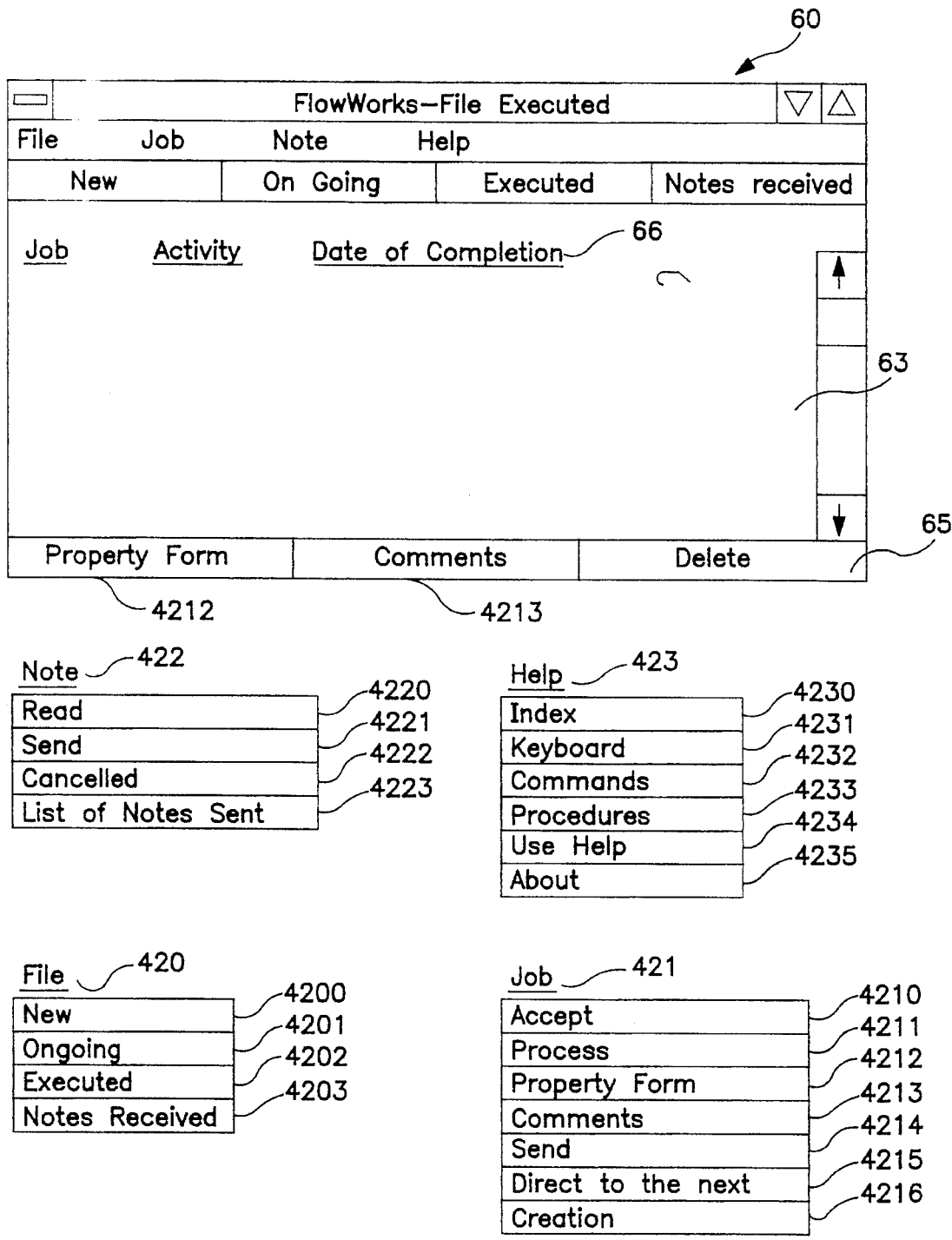

The "file executed" window shown in FIG. 6 includes not only the title bar and menu bar in the frame (63) but also "job" and "activity" columns, a column (66) enabling the display of the date of completion of the job or activity, and at the bottom of the frame, a command button line (65) constituted by the command buttons "property form", "comments", and "delete"; these functions are also the only ones that can be selected in the "job" menu.

Finally, FIG. 7 shows the "notes received" window, which includes the title bar, the menu bar, and a frame (73), which makes it possible, in a column (731), to display "sender", in a column (732) to place the date of reception of the note, and in a column (733) to display the subject of the note.

This window also includes a bar (75) constituted by a single command button "read note", making it possible to read the note.

Figure 5:
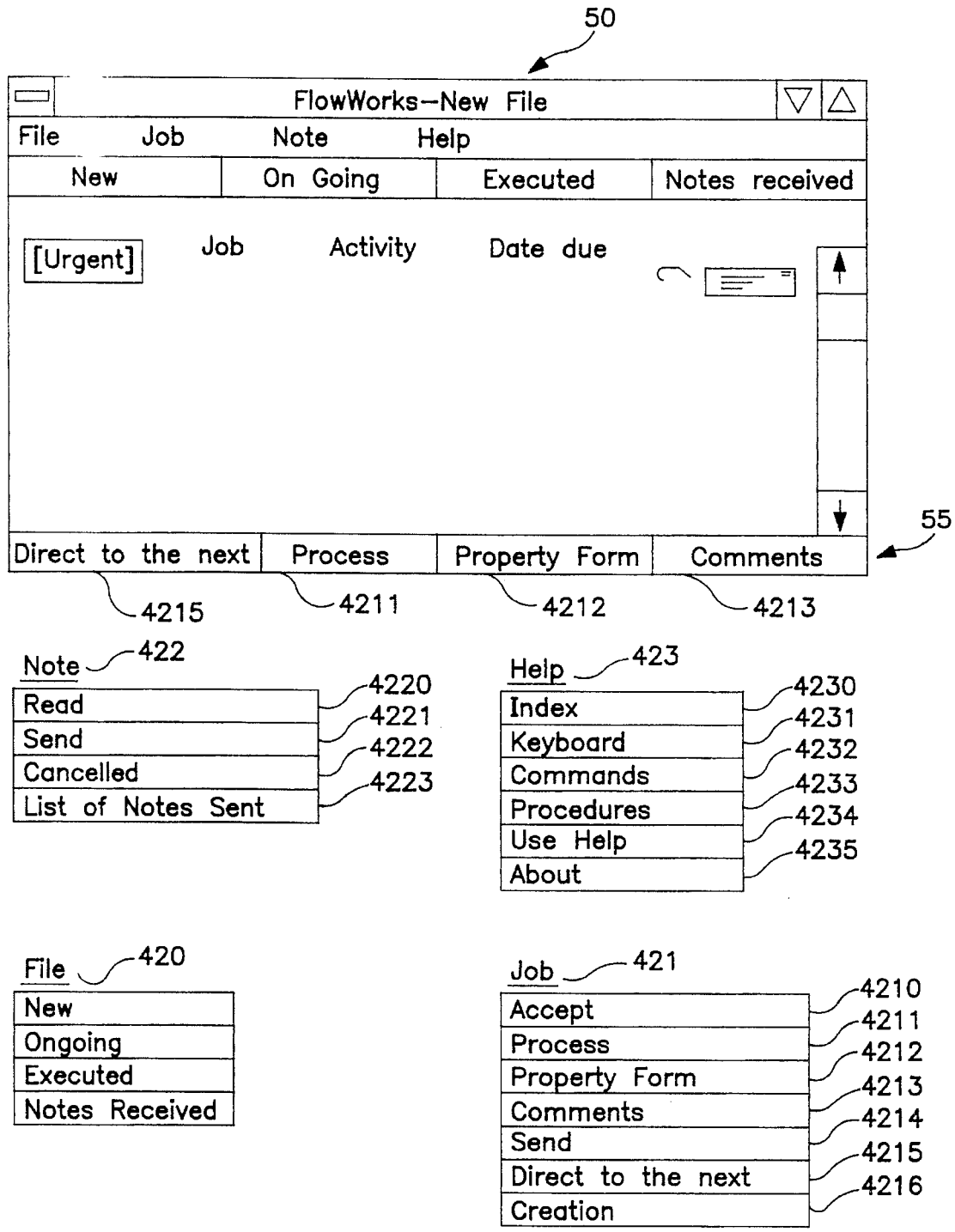
FIGS. 5–15 shows various windows used by the user interface of the transactional system.
Figure 8:
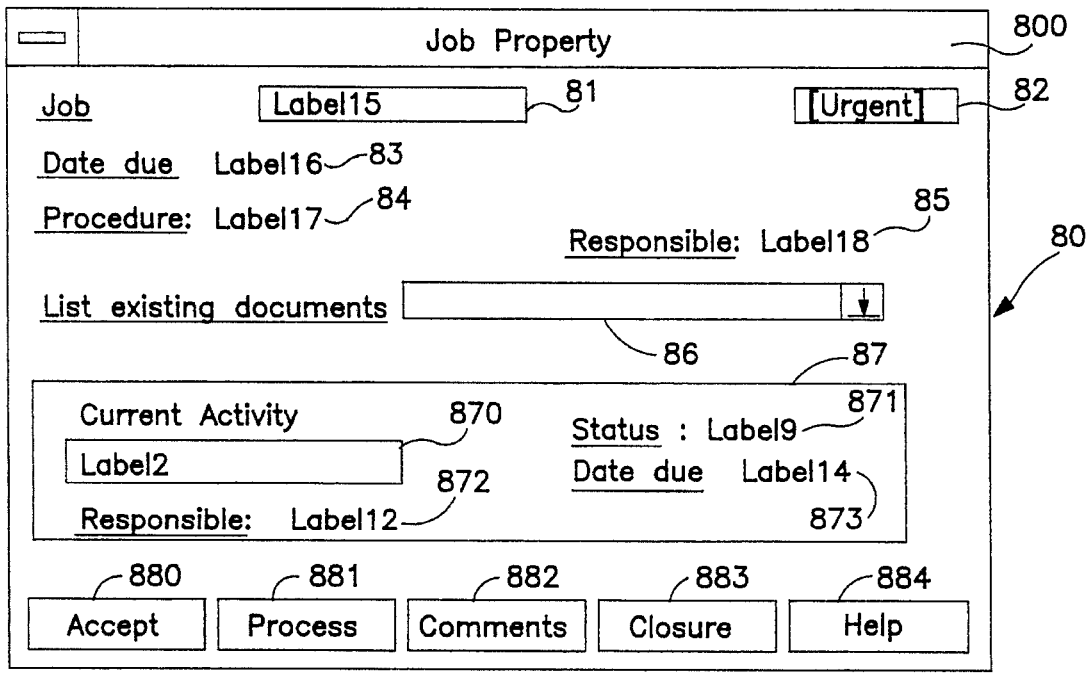

Selecting the "property form" function (4212) in a "new file" window (FIG. 4); ongoing file (FIG. 5); "executed file" (FIG. 6) causes the "job property" window to appear, shown in FIG. 8. This window makes it possible to call up an editing function and it includes a first field (81) making it possible to write the job name and a table (82) causing the term "urgent" to appear if the job had been designated as urgent.

A second field (83) makes it possible to indicate the date by which the job must be completed, a third field (84) makes it possible to indicate the name of the procedure to which the job is connected, a fifth field (85) make sit possible to indicate the name of the person or entity responsible for the job, and a scrolling window (86) makes it possible to display the list of documents attached to the job. A box (87) enables the display of four fields relating to the current activity, a first (870) indicating the activity name, a second (871) indicating the status of the task of the current activity, a third (872) indicating the person or entity responsible for the task, and a fourth (873) given the date by which the task must be executed.

Two arrows, not shown in the bar of command buttons (880–883), one labeled previous and the other labeled next, make it possible to see the property form of the previous job and the property form of the next job, respectively.

Figure 9:
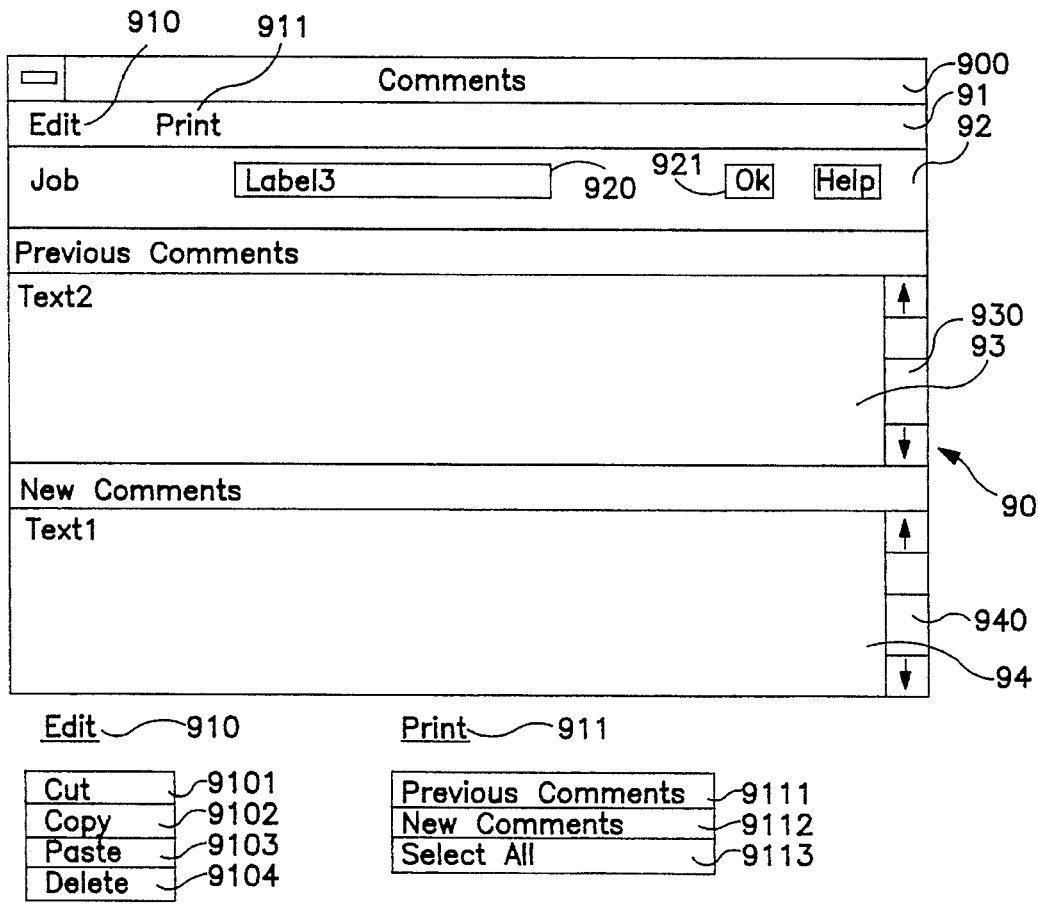

The "accept" command button (880) cannot be used except when the status of the task is new. A second command button, "process" (881) can be used only when the status of the task is accepted, suspended or new. A third command button "comments" (881), opens the comments window, which is described in conjunction with FIG. 9. A fourth command button, "closure" (882) closes the "job property" box window (80), and a fifth command button, "help" (883), makes it possible to obtain assistance.

The "comments" window (90) includes a title bar (900), a menu bar (91) making it possible to call up the editing or printing function, a "job" field (92) in which the job name may be placed in the editing box (920), and two text boxes (93, 94) labeled "previous comments" and "new comments". An "OK" command button (921) makes it possible to close the box by performing the recordation of the new comment, if any.

The menu (91) includes a "print" menu enabling starting the following functions: "previous comments", "new comments", "select all"; and an editing menu making it possible to start the following functions: "cut", "paste", "delete", "copy".

Figure 10:
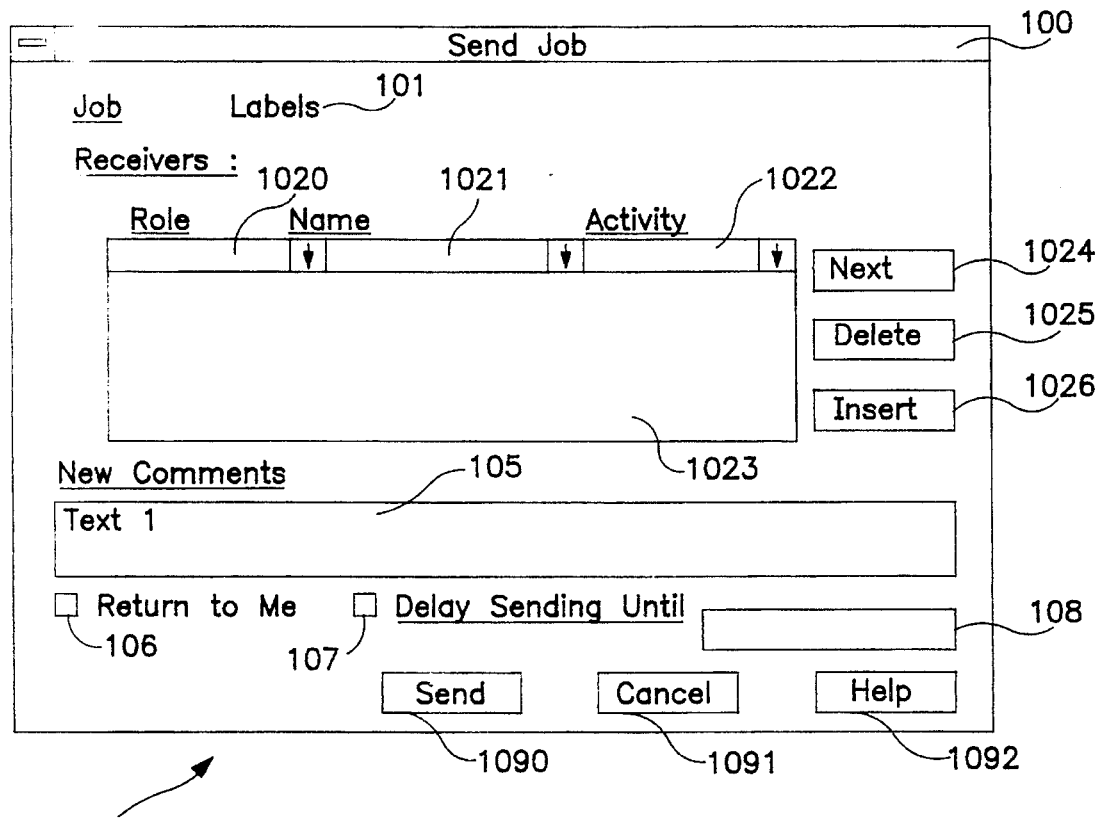
Figure 11:
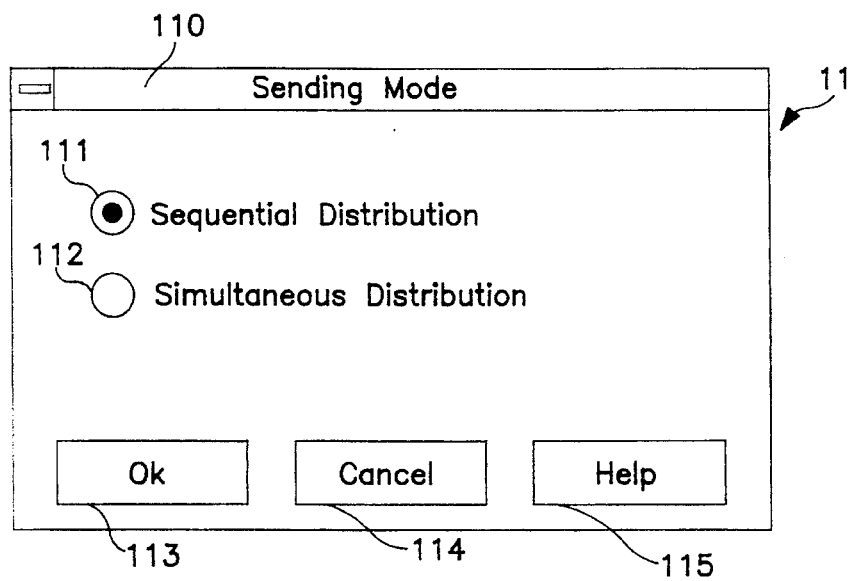

FIG. 10 shows the window that is displayed on the screen of the user station when the user selects the "send job" junction. This window includes a title bar, "send job" (100), and a field (101) enabling indicating the job name, a portion (102) relating to the receivers, a portion (106) relating to resending the job, a text box labeled "new comments" (105), which will include all the comments from the sender and in which the sender will be capable of adding new comments intended for the receiver, a control button (107) that assures the "send delayed until" function, followed by a text box (108) in which the user can enter the date when he wants the task to be sent, the command buttons "send" (1090), whose function may or may not depend on whether there are a plurality of receivers and if there is only one receiver then sending is done with a click on the command button, while if there are multiple receivers, a click on the "send" button opens the "sending mode" dialog box described hereinafter in conjunction with FIG. 11, and a command button "cancel" (1091) to close the "send job" box without sending having been done.

The portion relating to the receiver is composed of combined boxes labeled "role" (1020), "name" (1021), "activity" (1022), in which the user can choose an element or can write what he wants. The default value is not defined, and only one of the three parameters of the receiver needs to be met. If the user does not meet at least one of the parameters, then the "send" command will not be valid.

Also provided is a list box in which each line is supplemented with the values of combination boxes, a "next" command button (1024) to go to the next line, a "delete" command button (1025) to delete a line from the list, and a "insert" command button (1026) to insert a free line between the line selected and the line below it.

The window 11 of the sending mode, via its dialog box including two option buttons, makes it possible to send the job, by a first button (111) for sequential distribution to each person on the list in a sequential mode and in a circulation order corresponding to the order on the list, and by a second button (112) for simultaneous distribution, where the job will be sent to each person on the list in a parallel mode.

This dialog box also includes the "OK" command button (113) to confirm the choice and complete the sending, a "cancel" command button (114) to close the box, and a command button (115) to request help.

Figure 12:
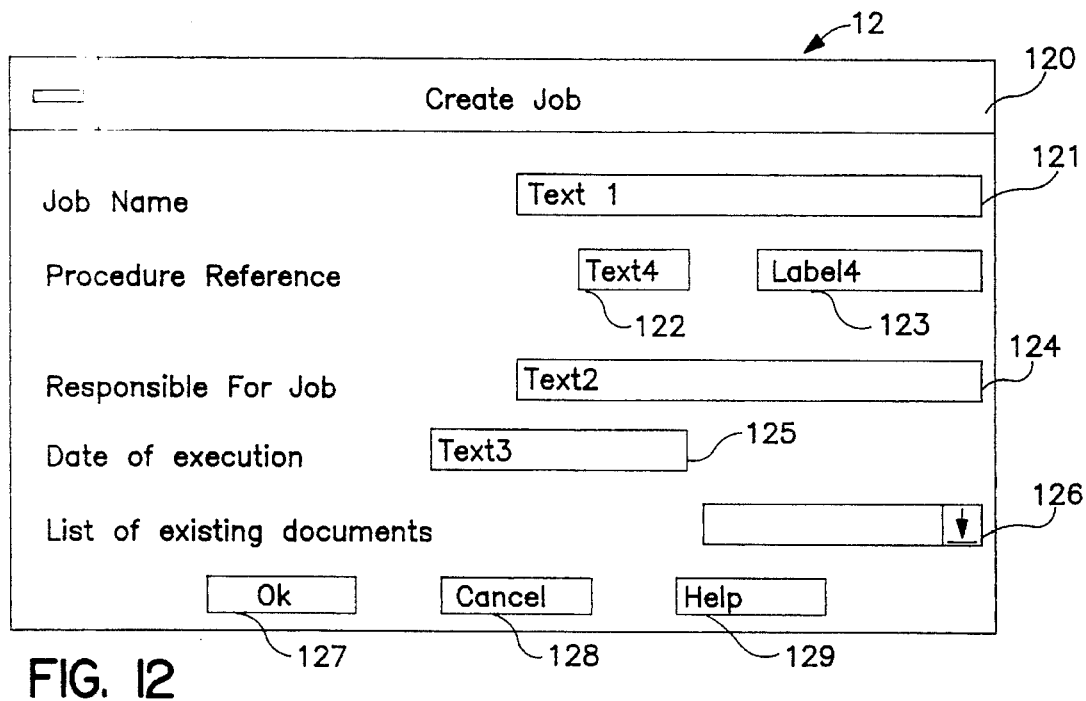

The "create job" function is represented in FIG. 12 by a window (12) including a "create job" title bar (120) and a field (121) by which the job name can be entered in a text editing box; a second field, "procedure reference", enabling the entry of the name of the procedure into a box (122) and of a label into a box (123); a third field, "person or entity responsible for the job", with which the name of the responsible person or entity can be entered into a fourth box (124); a fourth field, "date by which the job must be done", including a fifth box (125) making it possible to enter the date; a fifth field (126) making it possible to display the list of existing documents, and the validation command button "OK" (127), cancellation command button (128), and help command button (129).

Figure 13:
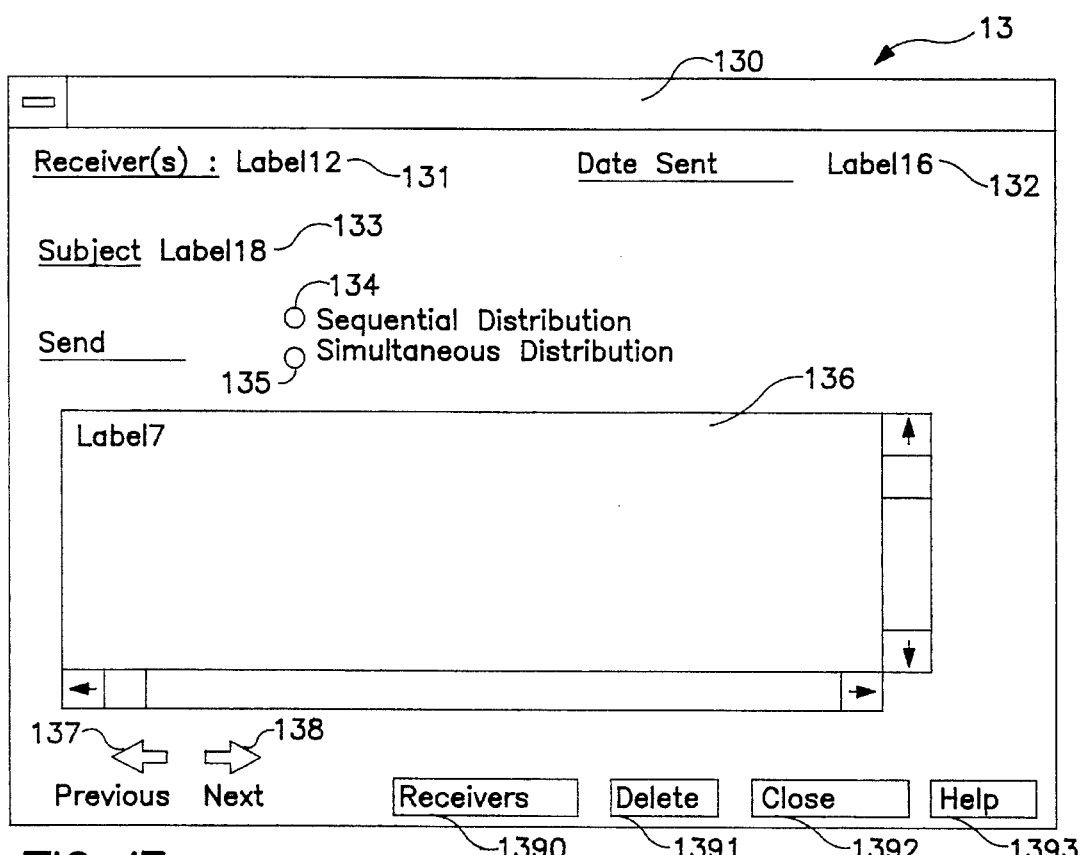
Figure 14:
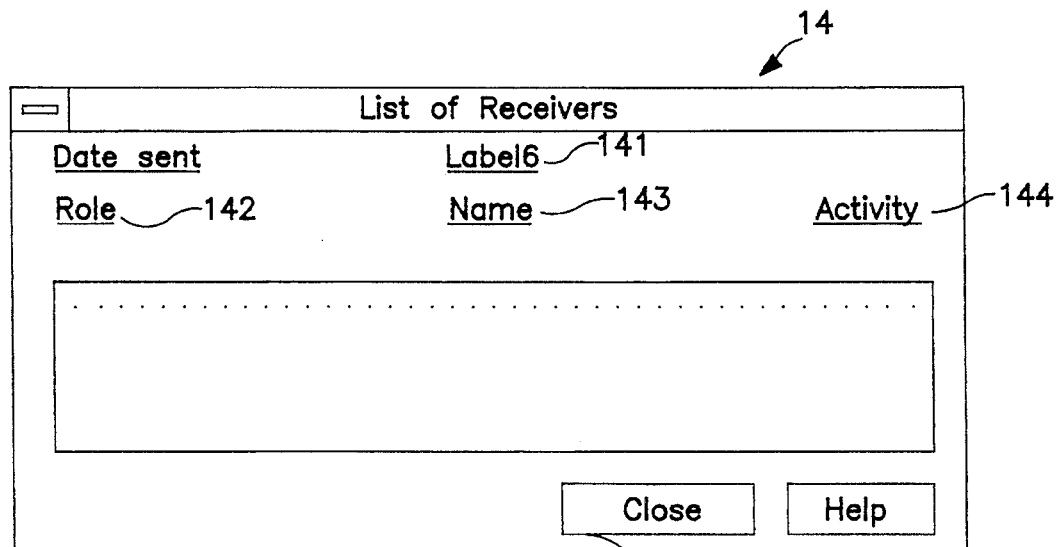

The "send notes" function is shown in FIG. 13 and causes a window (13) to appear including a title bar (130), a first field (131) by which the receiver can be made to appear, a second field (132) by which the sending date can be made to appear, a third field (133) by which the subject of the note can be made to appear, a set of two option buttons enabling a choice between sequential distribution, by a button (134), and simultaneous distribution, by a button (135). A box (136) enables selecting the names of the notes to be sent from among a list in this box. A "previous" arrow (137) and another "next" arrow (138) make it possible to select the previous note or the next note in the list. Finally, there are command buttons: "receiver" (1390) making it possible to call up the function enabling the opening of a list of receivers, which is shown in FIG. 14; a button (1391) makes it possible to delete a note; a button (1392) enables closing the "send notes" window; and a button (1393) makes it possible to call for help.

The "list of receivers" box (14) includes a field (141) indicating the sending date and a text box including the list of receivers, which is composed of three columns: A first (142) indicating the role, a second (143) indicating the name, and a third (144) for the activity. A "closure" command button (145) enables closing the window 14.

The "notes received" function is attached to the selection of the "read note" function (4220) and enables the display of a window identical to that for sending, except that the title is "reception of notes", the sender replaces the receiver, the two option buttons for sending are omitted, and the possibility of documenting a list of receivers with a command button has also be omitted, since this function is not necessary in the reception of notes. The other elements, that is, the text box with the horizontal and vertical scrolling bar, the "previous" and "next" arrows, and the commands "delete", "closure" and "help" are preserved.

Figure 15:
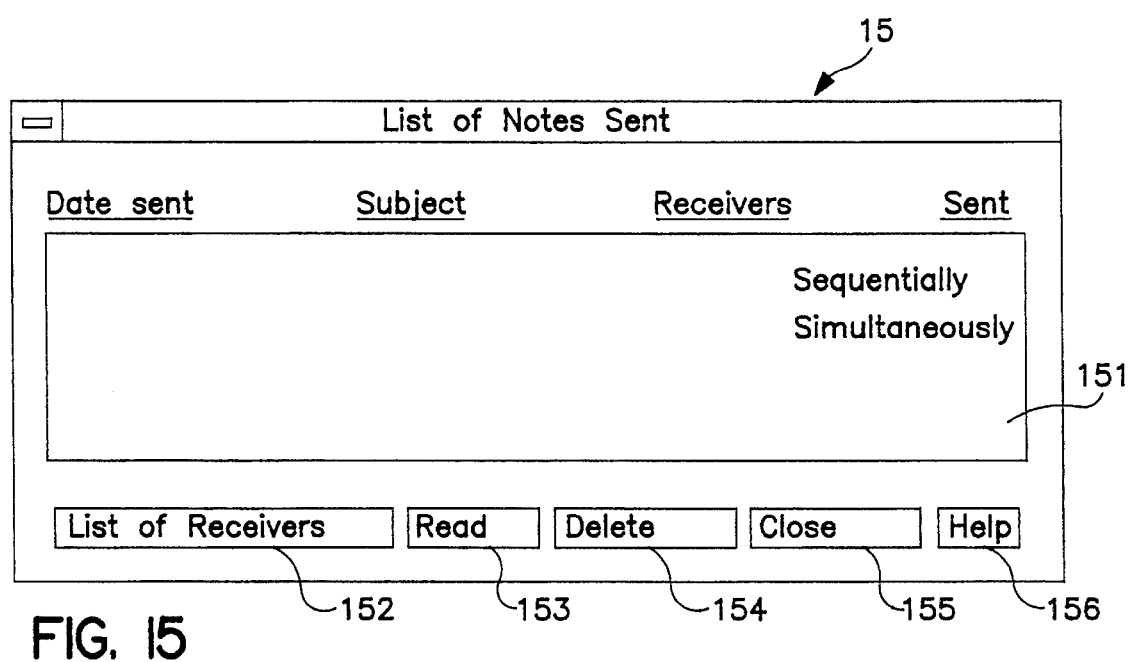

Finally, the "list of notes sent" function when selected causes a window (15) to appear, represented in FIG. 15, in which a list box (151) with the following columns, "send date", "subject", "receiver", and "sent", makes it possible to cause the sending date, the subject and the receiver to which the note has been sent to appear in each line, as well as the fact of whether the note was sent sequentially or simultaneously. This window also includes the command buttons for display of the list of receivers (152), reading the note (153), deletion (154), closure (155), and help (156).

The functions and presentations described above, performed by the presentation and file constitution software which is part of the user interface, greatly facilitates the use of the transactional processing system and improves its ergonomics.

What is claimed is:

1. A user interface for a system of transactional processing between an information processing server and a plurality of workstations, wherein said server includes a plurality of modules which provide defined services to individuals, called actors, using said transactional processing system, said user interface comprising a memory having three files stored therein, said files reflecting the states of progress of tasks assigned to an actor using said interface, said three files being a "new" file (40), an "ongoing" file (50), and an "executed" file (60) wherein said new file contains tasks newly assigned to the actor, the ongoing file contains tasks accepted, that are in the course of being executed or have temporarily been suspended, and the executed file contains the tasks accomplished, sent to another actor or abandoned, and further wherein said user interface includes means for opening the new file, ongoing file and executed file, means for describing the three files, and means for representing notes received by each of the three files, wherein said notes contain messages sent by other actors of the transactional processing system or by modules of the transactional processing system.

2. The interface of claim 1, wherein the means for opening, means for describing and means for representing each comprise a display window including at least one menu bar, which enables selection and execution of at least one of the following functions, "send job", "create job", "send notes", "lists of notes sent", "list of receivers", and at least one text box.

3. The interface of claim 2, wherein the means for opening the new file includes a "new file" window, which via menu bar (42) enables the selection of one of three presentations, called respectively, "new file", "ongoing file" and "executed file" to cause a text box (43) to appear that includes a job designation column (430), an activity designation column (432), a date of completion designation column, a comments column (435), and a priority column (434) indicating the notation "urgent" or "not urgent".

4. The interface of claim 3, wherein the "new file" window includes a command button bar (45) which enables starting of the following functions: "accept", "process", "property form", and "comments".

5. The interface of claim 3, wherein upon selection of the "ongoing file" a bar of command buttons is displayed which enables the selection and execution of the following functions: "direct to the next", "process", "property form", and "comments".

6. The interface of claim 3, wherein upon selection of the "executed file" a bar of command buttons is displayed which enables the selection and execution of the following functions: "property form", "comments", and "delete".

7. The interface of claim 4, wherein the "property form" function causes the display of a job window (80) including a field (81) indicating a job name, a field (83) indicating the date by which the job must be finished, a field (84) indicating the procedure to which the job pertains, a field (85) indicating an actor responsible, a text box causing the current activity to which the job pertains to appear, and including fields indicating the activity name (870), status of the activity (871), a responsible person or entity for the activity (872), and date of completion (873), and a command button bar (880), (883) which enables the selection and execution of the following functions: "accept", "process", "comment", "close" and "help".

8. The interface of claim 4, wherein the selection of the "comments" function causes the appearance of a print window (90) that includes a menu bar (91) enabling the selection of an editing or a printing menu, and a job text box (920) which displays in a first field the job name, in a first text box (93) previous comments, and in a second text box (94) new comments, said first and second text boxes being provided with a vertical scrolling bar (930, 940), the print window 90 being provided with a validation command button (921).

9. The interface of claim 2, wherein the menu bar of each file window includes a "send job" function which causes the appearance of a send job window (10) that includes a field (101) for indicating a job name, a first text box (1023) with three columns for designating receivers of the jobs, including role of the receiver in a first column, name of the receiver in a second column, and activity of the receiver in a third column, a second text box (105) for including new comments, a first command button (106) for requesting the return of the job to the sender, a second command button (107) for delaying sending of the job until a date determined by information contained a third text box (108), a third button for validating the sending (1090), a fourth button for cancelling the sending (1011), and a fifth button for providing a help menu (1092).

10. The interface of claim 9, wherein said send job window (10) includes a "next" command button (1024), for selecting the next receiver, a "cancel" command button (1025) for cancelling one of the receivers, and an "insert" command button (1026) for inserting a new receiver into the list.

11. The interface of claim 10, wherein the third button (1090) for controlling validation of sending causes a dialog box (11) to be displayed for selecting a sequential distribution or simultaneous distribution.

12. The interface of claim 2, wherein the "create job" function causes a window (12) to appear that includes a first field for enabling entry of a job name in the first field of the window (12), a reference (123) of a procedure comprising a predefined set of work steps and a text in a second field (122), a person or entity responsible for the job in a third field (124), date of the job in a fourth field (125), and a list of existing documents in a fifth field (126), and further wherein the window 12 includes command buttons to validate (127) creation of the job, cancellation of (128) the creation of the job, or a help request (129).

13. The interface of claim 2, wherein the selection of the "send notes" and "list of notes sent" functions causes a window (13, 15) to appear that includes a text box (136, 151) and a command button bar (147 to 1395; 152 to 156) wherein the command button bar enables the selection of the following functions: "receivers (1390, 152), for displaying the list of receivers, "delete" (1391, 154) for deletion of a note, "close" (1392, 155) enabling closure of the window, and "help" (1393, 156) for obtaining help.

14. The interface of claim 13, wherein the selection of the "list of notes sent" function enables display of a text box (151) with four columns which indicate sending date of the note in a first column, subject of the note in a second column, receivers of the note in a third column, and a choice between sequential or simultaneous sending in a fourth column, and a command button bar is provided which additionally includes a button 9153) for controlling reading of the note.

15. The interface of claim 13, wherein selecting the "send notes" function (13) causes display of a window that includes a text box (136) with horizontal and vertical scrolling bars, command buttons in the bars, a first arrow (137) called "previous" enabling selection of a previous note and a second arrow (138) called "next" enabling selection of a next note, a first button (134) and a second button (135) for selection between sequential sending of a note and simultaneous sending of a note, respectively, and fields for designating subject (133) of a note, send date (132) of a note, and receivers (131) of a note.

16. The interface of claim 14, wherein the selection of the "list of receivers" function causes a window (14) to be displayed that includes a field (141) indicating send date to a receiver of a note and a text box (147) with a first column for designating the role of the receivers (142), a second column (143) for designating the name of the receiver, and a third column (144) for designating the activity of the receiver, and a button (145) for controlling the closure of the window.

\* \* \* \* \*